1

2,836,625

SULFONIUM COMPOUNDS

William E. Weesner, Dayton, Ohio, assignor to Monsanto Chemical Company, St. Louis, Mo., a corporation of Delaware No Drawing. Application May 18, 1956
Serial No. 585,611

8 Claims. (Cl. 260—607)

The present invention relates to organic compounds of sulfur and iodine and more particularly provides a new class of sulfonium triiodides, the method of preparing the same and biological toxicants in which the triiodides are employed as the effective ingredients.

According to the invention there are provided new and valuable compounds of the formula $$\left[ X-ar-\overset{R}{\underset{R'}{S}}- \right]^+ I_3^-$$

in which X is halogen, ar denotes an aryl radical of from 6 to 12 carbon atoms and R and R' are alkyl radicals of from 1 to 8 carbon atoms. Triiodides of the above formula are readily prepared by contacting an appropriate bis(haloaryl)disulfide with an appropriate alkyl iodide substantially according to the scheme:

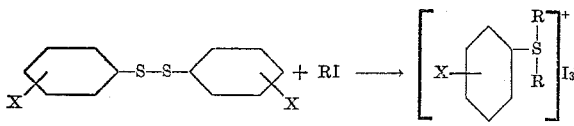

Examples of triiodides provided by the present invention are (4-chlorophenyl)dimethylsulfonium triiodide obtained from bis-(4-chlorophenyl)disulfide and methyl iodide; (2-bromophenyl)-di-n-butylsulfonium triiodide obtained from bis(2-bromophenyl)disulfide and n-butyl iodide; (4-fluoro-2-ethylphenyl)diamylsulfonium triiodide obtained from bis(4-fluoro-2-ethylphenyl)disulfide and amyl iodide; (2-chloro-1-naphthyl)diheptylsulfonium triiodide obtained from bis(2-chloro-1-naphthyl)disulfide and heptyl iodide; (4-iodo-4'-biphenylyl)diethylsulfonium triiodide obtained from bis(4-iodo-4'-biphenylyl)disulfide and ethyl iodide; (4-iodophenyl)-bis(2-ethylhexyl)sulfonium triiodide obtained from bis(4-iodophenyl)disulfide and 2-ethylhexyl iodide, etc. Reaction of the (haloaryl)disulfide with the alkyl iodide to obtain the present sulfonium triiodides is effected by heating a mixture of the two reactants at, say, temperatures of from 80° C. to 200° C. Reaction may be effected in the presence or absence of an inert diluent or solvent and either at ordinary or at super-atmospheric pressures. Advantageously, the reactants are heated in a closed vessel, e. g., an autoclave, at temperatures of from 120 to 170° C. Preferably the alkyl iodide is used in excess. Unreacted material may be removed by washing the crude reaction product with ether or hexane. Since the reaction involves condensation of four moles of the alkyl iodide with one mole of the (haloaryl)disulfide, these reactants are advantageously employed in stoichiometric proportions; however, an excess of either reactant may be employed and separated from the desired triiodide.

The present (haloaryl)dialkylsulfonium triiodides are relatively stable, well-characterized compounds which are generally solids. They are advantageously employed for a variety of industrial and agricultural purposes, as will be herein disclosed. They are also characterized by the ease with which they form complexes with certain metal halides; and such complexes form the subject of my copending application Serial No. 585,610, filed of even date.

The present triiodides are of interest as biological toxicants, being particularly effective against bacteria and nematodes, as will be hereinafter disclosed.

The present invention is further illustrated but not limited by the following examples:

Example 1

A mixture consisting of 23.0 g. (0.08 mole) of bis(4-chlorophenyl)disulfide and 25 ml. of methyl iodide was heated in a 300 ml. rocking bomb to a temperature of 136° C. within 34 minutes, and then held at a temperature of from 130° C. to 140° C. for about 20 hours. The solid material which was formed was removed, washed with 50:50 ether-alcohol, filtered and dried to give 36.4 g. of the substantially pure (4-chlorophenyl)dimethylsulfonium triiodide, brown needles, M. P. 78–81° C., analyzing as follows:

| | Found | Calcd. for $C_8H_{10}ClI_3S$ |
|---|---|---|
| Percent C | 17.37 | 17.31 |
| Percent H | 2.04 | 1.80 |
| Percent S | 5.33 | 5.77 |
| Percent I | 67.72 | 68.71 |
| Percent Cl | 6.47 | 6.40 |

Example 2

This example describes nematocide evaluation of the (4-chlorophenyl)dimethylsulfonium triiodide of Example 1. The complex was introduced into a culture of live nematodes (*Panagrellus redivivus*) at a concentration of 0.1%. It is known that a nematode when placed in water flexes its body at a more or less constant rate and that the effect of a nematocide can be estimated by counting the rate of this flexing action. This motility was observed through a microscope and the number of flexures was counted, the effect of the nematocide being expressed as a percentage of the normal flexing rate of control dispersion not containing a nematocidal agent. The following table sets forth the motility of the nematodes as compared to a "control" culture of nematodes which was identical to the test culture except for the triiodide content.

| Motility After— | Culture containing 0.1% of triiodide | Control Culture, percent |
|---|---|---|
| 10 minutes | 0 | 100 |
| 20 minutes | 0 | 100 |
| 30 minutes | 0 | 100 |
| 60 minutes | 0 | 100 |
| 2 hours | 0 | 100 |

Example 3

This example shows testing of the (4-chlorophenyl)dimethylsulfonium triiodide of Example 1 against *Micrococcus pyogenes* var. *aureus* and *Salmonella typhosa*. A 1% stock solution of the triiodide in a non-toxic solvent was added to nutrient agar to give respective test samples containing one part of the triiodide per 1,000 parts of the agar and one part of the triiodide per 10,000 parts of the agar. Petri dishes were respectively filled with each of the two test mixtures, and the plates thus prepared were then respectively inoculated with said *Micrococcus pyogenes* and said *Salmonella typhosa* organisms and incubated for 5 days at a temperature of 25° C. At the end of that time inspection of the plates showed complete inhibition of growth of both organisms

What I claim is:

1. (Chlorophenyl)dialkylsulfonium triiodides having from 1 to 8 carbon atoms in the alkyl radical.

2. (4-chlorophenyl)dimethylsulfonium triodide.

3. The method which comprises heating a bis(chlorophenyl)disulfide with an alkyl iodide having from 1 to 8 carbon atoms in the alkyl radical and recovering from the resulting reaction product a bis(chlorophenyl)dialkylsulfonium triiodide having from 1 to 8 carbon atoms in the alkyl radical.

4. The method which comprises heating bis(4-chlorophenyl)disulfide with methyl iodide and recovering (4-chlorophenyl)-dimethylsulfonium triiodide from the resulting reaction product.

5. A biological toxicant comprising an inert carrier and the compound defined in claim 1 as the effective ingredient.

6. A bacteriostatic composition comprising an inert carrier and the compound defined in claim 1 as the effective ingredient.

7. A nematocidal composition comprising an inert carrier and the compound defined in claim 1 as the active ingredient.

8. A nematocidal composition comprising an inert carrier and (4-chlorophenyl)dimethylsulfonium triiodide as the effective ingredient.

References Cited in the file of this patent

Selker et al.: Ind. Eng. Chem. 36, 16–20 (1944).